United States Patent

Kadowaki et al.

Patent Number: 5,693,111
Date of Patent: Dec. 2, 1997

[54] METHOD FOR SEALEDLY FORMING ENVELOPE

[75] Inventors: Akira Kadowaki; Shigeo Itoh; Youich Kogure; Takeshi Tonegawa, all of Mobara, Japan

[73] Assignee: Futaba Denshi Kogyo K.K., Mobara, Japan

[21] Appl. No.: 498,802

[22] Filed: Jul. 6, 1995

[30] Foreign Application Priority Data

Jul. 8, 1994 [JP] Japan .................................. 6-179701

[51] Int. Cl.⁶ .......................... C03C 27/04; C03C 27/12
[52] U.S. Cl. .......................... 65/43; 65/40; 65/58
[58] Field of Search ........................ 65/33.5, 33.6, 65/36, 40, 43, 58, 59.1; 156/107, 109, 308.4

[56] References Cited

U.S. PATENT DOCUMENTS

| | | | |
|---|---|---|---|
| Re. 25,791 | 6/1965 | Claypoole | 65/33.6 X |
| 3,217,088 | 11/1965 | Steierman | 65/40 X |
| 3,486,871 | 12/1969 | Martin | 65/33.6 |
| 3,503,763 | 3/1970 | Mills | 65/33.6 X |
| 4,131,445 | 12/1978 | Klockenga | 65/40 |
| 4,132,539 | 1/1979 | Jeffries | 65/40 |
| 4,564,932 | 1/1986 | Lange | 369/286 |
| 5,009,689 | 4/1991 | Haisma et al. | 65/33.6 X |
| 5,021,074 | 6/1991 | Kavacik et al. | 65/40 |

*Primary Examiner*—Donald E. Czaja
*Assistant Examiner*—Sean Vincent
*Attorney, Agent, or Firm*—Oblon, Spivak, McClelland, Maier & Neustadt, P.C.

[57] ABSTRACT

A method for sealedly forming an envelope and an apparatus therefor capable of sealedly bonding an anode substrate and a cathode substrate to each other while preventing misregistration therebetween. A sealing glass material is arranged on a periphery of one of the substrates and the other substrate is put on the one substrate. Then, both substrates are registered with each other and then a laser beam is downwardly irradiated on the sealing glass material through the anode substrate to locally melt the sealing glass material, to thereby temporarily bond both substrates to each other. Then, both substrates are heated in an oven, to thereby sealedly bonded to each other, resulting in sealedly forming an envelope.

5 Claims, 6 Drawing Sheets

METHOD FOR SEALEDLY FORMING ENVELOPE

BACKGROUND OF THE INVENTION

This invention relates to a method for sealedly forming an envelope and an apparatus therefor, and more particularly to a method for sealedly forming an envelope for a display device such as a fluorescent display device, a field emission type display device or the like so as to keep an interior thereof at a vacuum or a desired atmosphere and an apparatus therefor.

A fluorescent display device (VFD), a field emission type display device (FED) or the like generally includes a glass envelope constituted by at least an anode substrate having phosphor-deposited anodes arranged thereon and a cathode substrate having cathodes arranged thereon. Electrons emitted from the cathodes and therefore cathode substrate are guided to a predetermined position on the anode substrate at a predetermined timing, resulting in desired images, characters or the like being displayed.

For this purpose, it is required that the anode substrate and cathode substrate are precisely positionally aligned or registered with respect to each other after both substrates are sealedly joined or bonded together to form the envelope. Unfortunately, both substrates tend to be misregistered or positionally deviated from each other during sealed joining therebetween.

Now, a procedure which has been conventionally employed for sealedly joining the anode and cathode substrates to each other to provide the glass envelope will be described with reference to FIGS. 5(a) and 5(b).

Figure 5A:
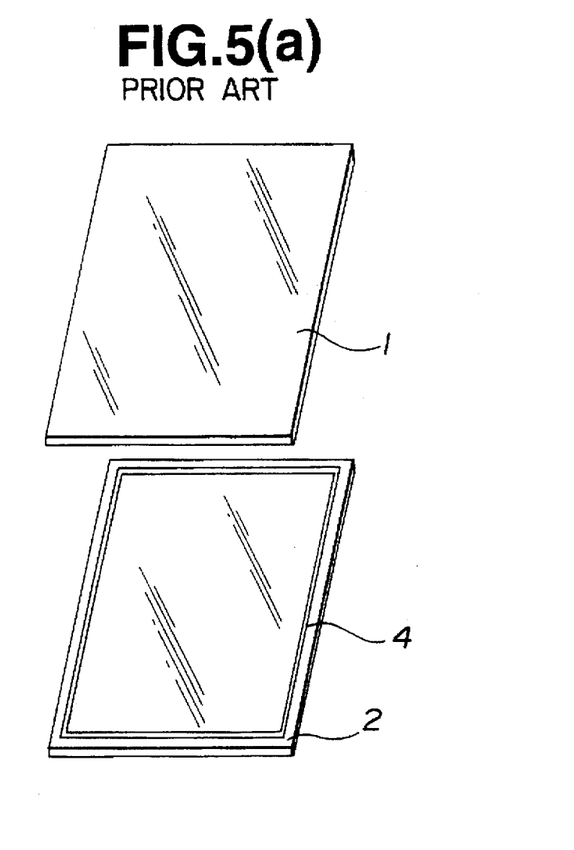
FIGS. 5(a) and 5(b) each are a perspective view schematically showing each of steps of a conventional method for sealedly forming a glass envelope.
Figure 5B:
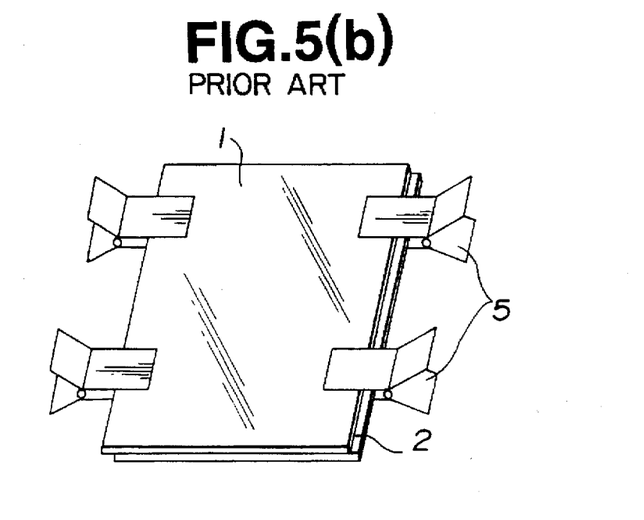

In FIGS. 5(a) and 5(b), reference numeral 1 designates an anode substrate made of glass and provided thereon with anodes each having a phosphor deposited thereon. 2 is a cathode substrate made of glass and provided thereon with cathodes for emitting electrons, control electrodes for controlling traveling of electrons emitted from the cathodes to the anodes and the like. 4 is a sealing glass material and 5 represents clips.

Formation of the glass envelope, as shown in FIG. 5(a), is carried out in a manner to apply or arrange the sealing glass material 4 to or on a periphery of one surface of the cathode substrate 2 and then superpose the anode substrate 1 on the cathode substrate 2. The cathode substrate 2 and anode substrate 1 each are provided with reference marks for registration or positional alignment therebetween, so that the anode substrate 1 and cathode substrate 2 are moved relatively to each other to resister the reference marks on the cathode substrate 2 with those on the anode substrate 1 while observing the marks through a microscope, resulting in registration or positional alignment therebetween being accomplished.

After the registration or positional alignment is thus completed, the cathode substrate 2 and anode substrate 1 are fastened together at four corners thereof by means of the clips 5 to prevent misregistration or positional deviation therebetween, as shown in FIG. 5(b). Then, the substrates 1 and 2 are placed in an oven while being kept fastened together by the clips 5, resulting in being heated. This causes the sealing glass material 4 of a low melting point to be melted to sealedly join both substrates 1 and 2 to each other.

Thereafter, the cathode substrate 2 and anode substrate 1 thus sealedly joined together are removed from the oven and then cooled, so that a glass envelope 30 constituted by the cathode substrate 2 and anode substrate 1 sealedly joined together through the sealing glass material 4 and having display elements received therein may be provided.

Now, a conventional fluorescent display device (VFD) which is one example of a display device including such a glass envelope as described above and display elements received in the envelope, as well as conventional sealing of the glass envelope will be described hereinafter with reference to FIGS. 6(a) to 6(c) and 7.

In FIGS. 6(a) to 6(c) and 7, reference numeral 1 designates a glass substrate provided thereon with anodes for capturing electrons emitted from a cathode substrate 2, as well as phosphors. The cathode substrate 2 is made of glass and provided thereon with filaments for emitting electrons, grids for controlling traveling of electrons emitted by the filaments to the anodes and the like. 3 represents side plates arranged between the anode substrate 1 and the cathode substrate 2 so as to space both substrates 1 and 2 from each other at a predetermined interval. 4 is a sealing glass material and 5 indicates clips.

Figure 6A:
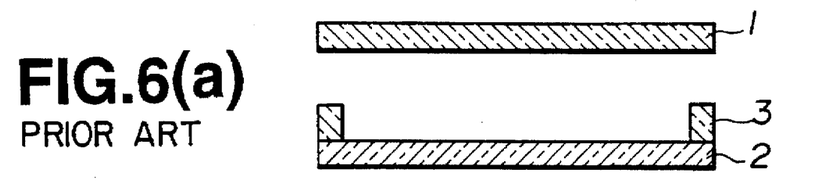
FIGS. 6(a) 6(b) and 6(c) each are a sectional view showing each of steps of a conventional method for sealedly forming a glass envelope for a fluorescent display device.
Figure 6B:
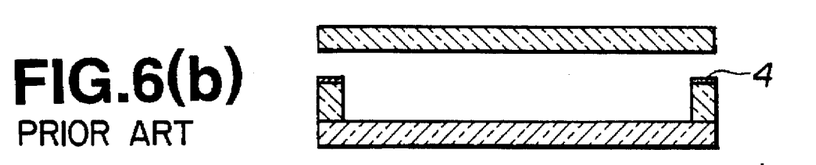
Figure 6C:
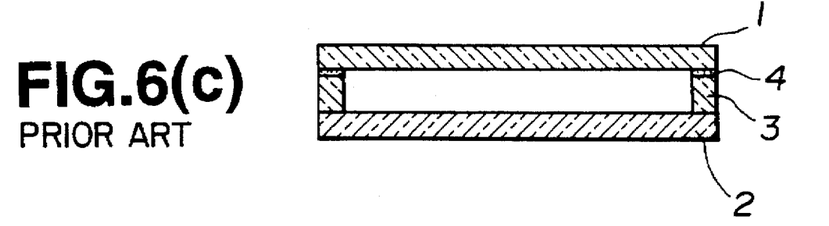

First, the anode substrate 1 is formed thereon with the anodes, each of which is deposited thereon with the phosphor. Then, the cathode substrate 2 and side plates 3 are combined together to form a box-like casing, in which an electron emission section including the filaments, grids and the like is then arranged. Subsequently, the sealing glass material 4 is applied to or arranged on an upper end surface of the side substrates 3, followed by arrangement of the anode substrate 1 in a manner to be opposite to the cathode substrate 2 through the side substrates 3 as shown in FIG. 6(b). Then, the anode substrate 1 is superposed on the cathode substrate 2 through the side plates 3 as shown in FIG. 6(C). Thereafter, the cathode substrate 2 and anode substrate 1 are registered with each other while observing reference marks (not shown) for registration provided at predetermined positions on both substrates.

Figure 7:
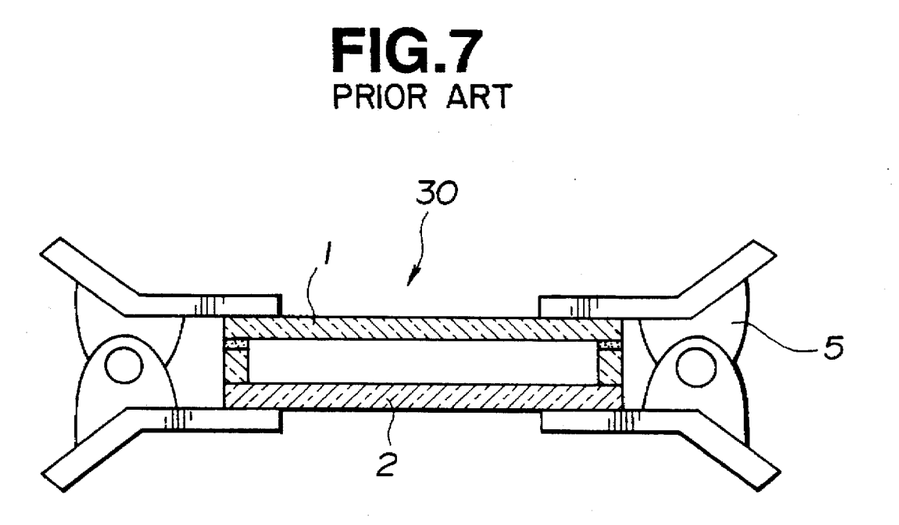
FIG. 7 is a sectional view showing a glass envelope interposedly held by clips during sealed formation thereof.

After completion of such registration between both substrates 1 and 2, the cathode substrate 2 and anode substrate 1 are securely fastened together by interposedly clamping four corners of the substrates by means of the clips 5, resulting in being prevented from being misregistered from each other. Then, both substrates 1 and 2.thus fastened together are placed in an oven for heating. This causes the sealing glass material 4 to be fused to join the cathode substrate 2 and anode substrate 1 to each other, so that a glass envelope 30 for the fluorescent display device in which the phosphor-deposited anodes, filaments, grids and the like are encapsulated may be provided.

In the fluorescent display device thus assembled, arrangement of the side plates 3 permits a narrow space or a gap of a microdistance to be formed between the cathode substrate 2 and the anode substrate 1, so that the filaments, grids and the like may be received therein.

The display device of the type wherein the display section is encapsulated in the glass envelope includes, in addition to the above-described fluorescent display device, a field emission type display device (hereinafter also referred to as "FED"). The FED is so constructed that a cathode substrate and an anode substrate are arranged so as to be spaced from each other at an interval as small as 1 mm or less. Thus, in order to keep both substrates spaced from each other at such a decreased interval, it is required to extremely reduce a thickness of the side plates. Unfortunately, this is substantially impossible. In view of the disadvantage, it was proposed that a suitable replacement such as, for example, glass beads of a microdiameter are used in place of the side plates to provide the glass envelope wherein the anode substrate and cathode substrate are spaced from each other through the glass beads.

Now, sealed formation of the glass envelope for the FED wherein the cathode substrate and anode substrate are spaced from each other at an interval as small as about 200 µm will be described with reference to FIGS. 8(a) to 8(c) and 9 by way of example.

In FIGS. 8(a) to 8(c) and 9, reference numeral 1 designates a glass substrate provided thereon with anodes for capturing electrons emitted from a cathode substrate 2, as well as phosphors. The cathode substrate 2 is made of glass and provided thereon with cathodes for emitting electrons, control electrodes for controlling traveling of electrons emitted by the cathodes to the anodes and the like. 4 is a sealing glass material and 5 indicates clips. Reference numeral 6 designates glass beads of a diameter as fine as about 200 µm.

Figure 8A:
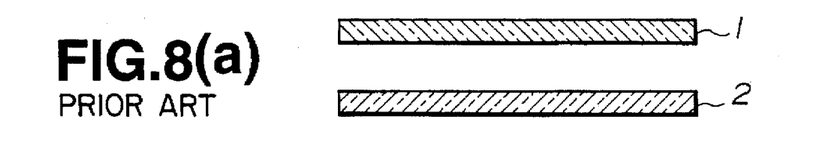
FIGS. 8(a) 8(b) and 8(c) 8(d) each are a sectional view showing each of steps of a conventional method for sealedly forming a glass envelope for an FED.
Figure 8B:
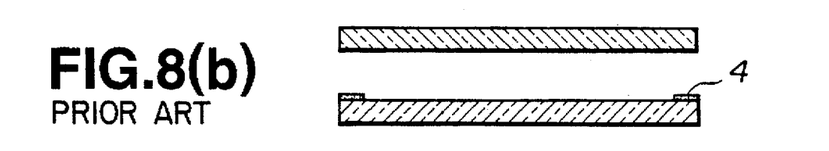
Figure 8C:
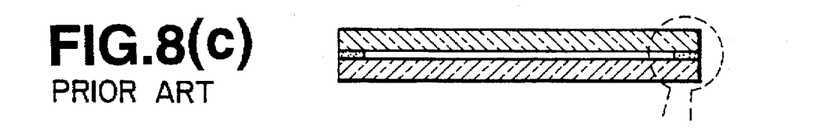
Figure 8D:
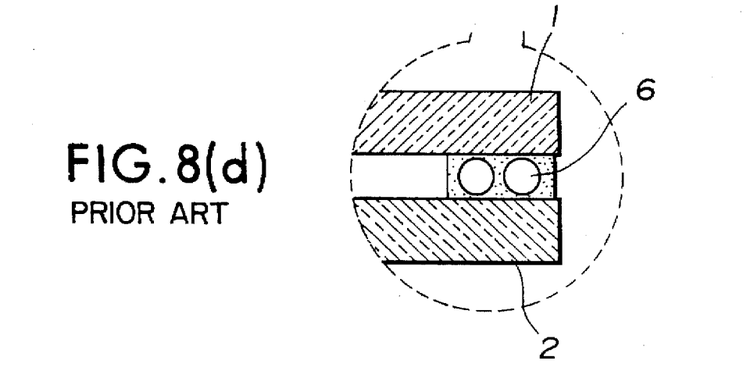

First, the anode substrate 1 is formed thereon with the anodes, each of which is deposited thereon with the phosphor. The cathode substrate 2 is provided thereon with the above-described electrodes of a fine structure using integrated circuit fabricating techniques. Then, the sealing glass material 4 which has the glass beads 4 of a microdiameter incorporated therein is applied to or arranged on a periphery of a surface of the cathode substrate 2, followed by arrangement of the anode substrate 1 in a manner to be opposite to the cathode substrate 2 as shown in FIG. 8(b). Then, the anode substrate 1 is superposed on the cathode substrate 2 through the sealing glass material 4 as shown in FIG. 8(C). Thereafter, the cathode substrate 2 and anode substrate 1 are registered with each other while observing reference marks (not shown) for registration provided at predetermined positions on on both substrates 1 and 2.

The sealing glass material 4, as described above, has the fine glass beads 6 incorporated therein, so that the anode substrate 1 and cathode substrate 2 may be oppositely arranged so as to be spaced from each other through a gap of a microdistance defined therebetween by the glass beads 6.

Figure 9:
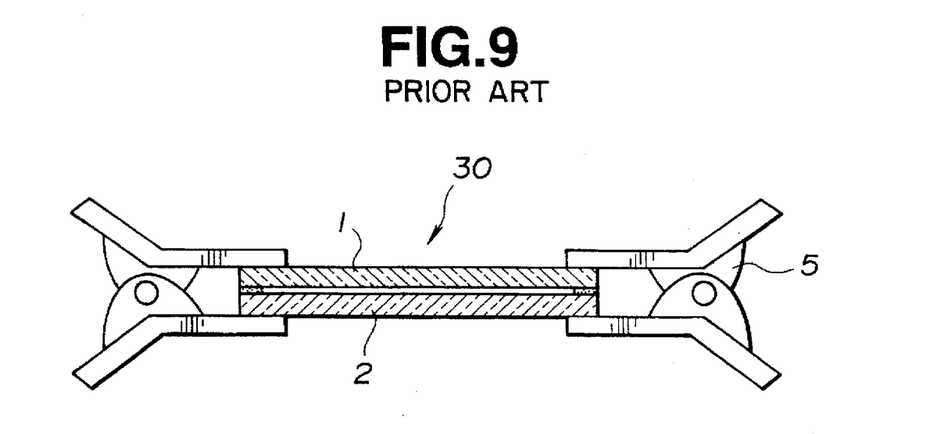
FIG. 9 is a sectional view showing a glass envelope interposedly fastened by clips during sealed formation thereof.

After completion of the registration, the cathode substrate 2 and anode substrate 1, as shown in FIG. 9, are securely fastened together by interposedly clamping four corners of the substrates by means of the clips 5, resulting in being prevented from being misregistered from each other. Then, both substrates 1 and 2 thus fastened together are placed in an oven for heating. This causes the sealing glass material 4 to be fused to join the cathode substrate 2 and anode substrate 1 to each other, so that a glass envelope 30 for the FED in which the phosphor-deposited anodes, electron emitting cathodes of a fine structure, control electrodes and the like are encapsulated may be provided.

In the FED thus constructed, incorporation of the glass beads 6 in the sealing glass material 4 permits a gap of a microdistance to be formed between the cathode substrate 2 and the anode substrate 1, resulting in the electrodes of a fine structure such as the cathodes, control electrodes and anodes being arranged therein in a manner to be opposite to each other.

In the above-described conventional sealed formation of the envelope for the display device which has been conventionally carried out, the cathode substrate 2 and anode substrate 1 are securely fastened together by means of the clips 5 after registration therebetween. This results in misregistration or positional deviation often occurring between both substrates because any external force such as vibration or the like is applied to the substrates at the time of handling the clips 5 for secure fastening of the substrates or during transferring of the substrates to the oven. Also, heating of the sealing glass material 4 for melting often fails to permit it to be uniformly melted or fused, leading to a likelihood that application of stress between both substrates by the clips 5 causes misregistration between the substrates during melting of the sealing glass material 4.

In the display device such as the fluorescent display device, FED or the like which includes the glass envelope 30, electrons emitted from the cathodes are captured by the anodes selectively driven at a predetermined timing, resulting in a desired image or character being displayed. Thus, it is required to receive the cathodes and anodes in the glass envelope 10 while keeping them precisely registered with respect to each other.

Therefore, any possible positive deviation or misregistration between the cathodes and the anodes or phosphors causes the anodes or phosphors to fail to effectively capture the electrons, leading to a deterioration in luminous efficiency of the phosphors and any color shift. This fails to permit a desired display to be provided with increased efficiency or requires to provide any control means for correcting the misregistration or positional deviation.

In particular, the FED is so constructed that the cathode substrate 2 and anode substrate 1 are spaced from each other at a microdistance. Such construction causes any possible misregistration between both substrates to highly adversely affect a luminous display of the FED.

Also, in order to prevent the misregistration or positional deviation, it would be considered to temporarily join both substrates together by means of an organic adhesive material, followed by sealed joining therebetween in the oven. Unfortunately, this causes any gas to be generated in the glass envelope due to decomposition of the adhesive during the joining, so that it contaminates the anodes and cathodes received in the glass envelope, to thereby adversely affect them.

SUMMARY OF THE INVENTION

The present invention has been made in view of the foregoing disadvantage of the prior art.

Accordingly, it is an object of the present invention to provide a method for sealedly forming an envelope which is capable of preventing misregistration or positional deviation between substrates for the envelope during transferring and sealing of the substrates.

It is another object of the present invention to provide a method for sealedly forming an envelope which is capable of rapidly and efficiently accomplishing temporary assembling of the envelope.

It is a further object of the present invention to provide a method for sealedly forming an envelope which is capable of minimizing generation of thermal strain possibly remaining in the envelope, to thereby substantially prevent damage to the envelope.

It is still another object of the present invention to provide a method for sealedly forming an envelope which is capable of accomplishing mass production of the envelope.

It is yet another object of the present invention to provide a method for sealedly forming an envelope which is capable of preventing a generation of any decomposed gas during sealing of the envelope.

It is even another object of the present invention to provide an apparatus for sealedly forming an envelope which is capable of preventing misregistration or positional deviation between substrates for the envelope during transferring and sealing of the substrates.

It is a still further object of the present invention to provide an apparatus for sealedly forming an envelope which is capable of rapidly and efficiently accomplishing temporary assembling of the envelope.

It is a yet further object of the present invention to provide an apparatus for sealedly forming an envelope which is capable of minimizing generation of thermal strain possibly remaining in the envelope, to thereby substantially prevent damage to the envelope.

It is a still further object of the present invention to provide an apparatus for sealedly forming an envelope which is capable of accomplishing mass production of the envelope.

It is an additional object of the present invention to provide an apparatus for sealedly forming an envelope which is capable of preventing any decomposed gas during sealing of the envelope.

In accordance with one aspect of the present invention, a method for sealedly forming an envelope is provided. The method comprises the steps of applying a sealing glass material to a periphery of at least one of a first substrate made of a glass material and a second substrate made of a glass, metal or semiconductor material, registering the first and second substrates with each other while superposing the substrates on each other through the sealing glass material, and heating the first and second substrates thus registered in an oven to sealedly bond the substrates to each other, to thereby sealedly form the envelope. The sealing glass material is locally heated by a local heating means after the registration between the first substrate and the second substrate, resulting in the first and second substrates being temporarily bonded to each other at at least two locations thereof. The step of heating the first and second substrates in the oven is carried out after the temporary bonding of the first and second substrates.

In a preferred embodiment of the present invention, the local heating means utilizes a laser beam.

In a preferred embodiment of the present invention, the laser beam is applied in such a manner that a pulse height of the laser beam is initially increased and then gradually decreased.

In a preferred embodiment of the present invention, a portion of the first and second substrates in proximity to the locations at which the temporary bonding is carried out is heated by a heater.

In a preferred embodiment of the present invention, the sealing glass material comprises amorphous glass of a low melting point having lead incorporated therein.

In accordance with another aspect of the present invention, an apparatus for sealedly forming an envelope is provided. The apparatus includes a sealing glass application means for applying a sealing glass material to a periphery of at least one of a first substrate made of a glass material and a second substrate made of a glass, metal or semiconductor material, a registration means for registering the first and second substrates with each other while superposing the substrates on each other through the sealing glass material applied, a temporary bonding means for locally heating the sealing glass material by a local heating means after registration between the first substrate and the second substrate by the registration means, resulting in the first and second substrates being temporarily bonded to each other at at least two locations thereof, and a sealing means for heating the first and second substrates after temporary bonding of the first and second substrates by the temporary bonding means, to thereby sealedly bond the first and second substrates to each other.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, in which like reference numerals designate like or corresponding parts throughout; wherein.

DETAILED DESCRIPTION OF THE PREFERRED EMBODIMENTS

Now, the present invention will be described hereinafter with reference to FIGS. 1 to 4.

Figure 1:
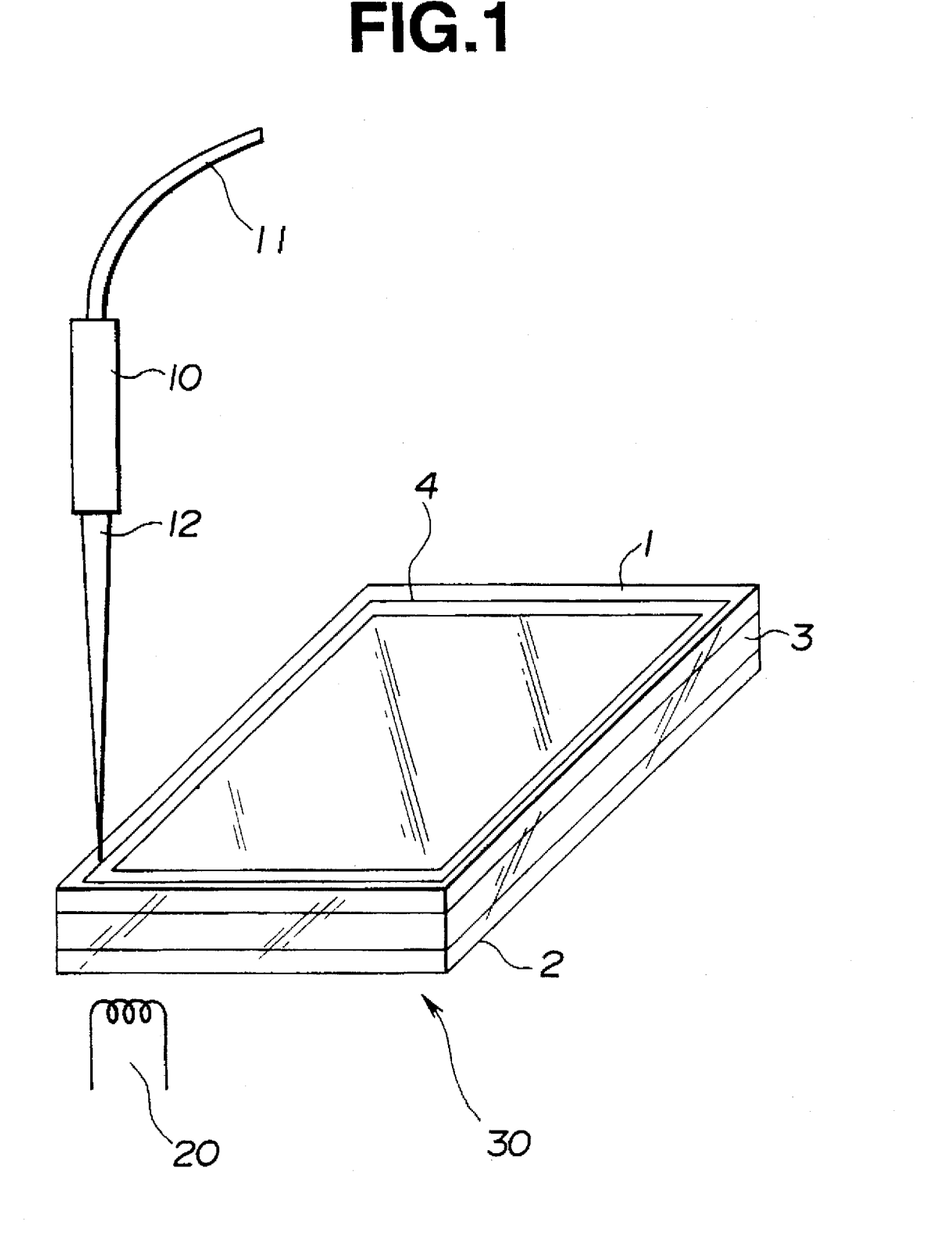
FIG. 1 is a perspective view showing an embodiment of an apparatus for sealedly forming an envelope for a display device according to the present invention which is used for practicing a method for sealedly forming an envelope according to the present invention.
Figure 2:
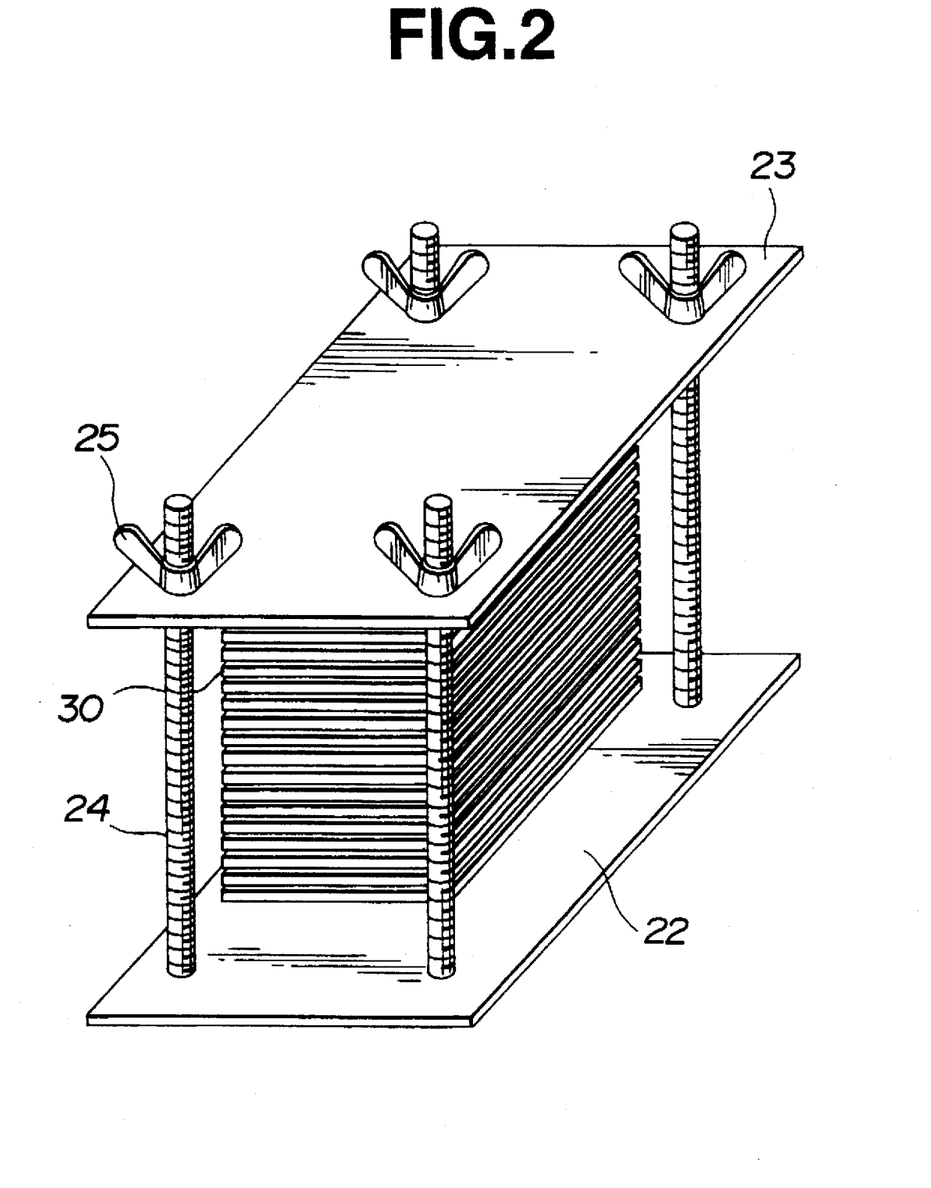
FIG. 2 is a perspective view showing a plurality of envelopes interposedly superposed on each other during sealing.

Referring first to FIGS. 1 and 2, an embodiment of each of a method for sealedly forming an envelope and an apparatus therefor according to the present invention is illustrated. The illustrated embodiment will be described in connection with a glass envelope for a fluorescent display device by way of example.

In FIGS. 1 and 2, reference numeral 1 designates an anode substrate made of glass and provided thereon with anodes for capturing electrons emitted from a cathode substrate 2, each of which anodes is deposited thereon with a phosphor. The cathode substrate 2 is likewise made of glass and provided thereon with filaments for emitting electrons, grid for controlling traveling of electrons emitted from the filaments to the anodes and the like. 3 represents side plates arranged between the anode substrate 1 and the cathode substrate 2 so as to oppositely space both substrates from each other at a predetermined interval, 4 is a sealing glass plate, 10 is an optical system for focusing a laser beam, 11 is an optical fiber for guiding a laser beam to the optical system, 12 is a laser beam emitted from the optical system 10, and 20 is a heater for heating.

Also, in FIG. 2, reference numerals 22 and 23 respectively indicate a lower support plate and an upper support plate each made of glass which function to interposedly support or fasten a plurality of glass envelopes 30 therebetween in corporation with each other, 24 represents bolts for securely connecting the upper and lower support plates to each other, 25 represents nuts threadedly fitted on the bolts 24 for tightening the plates 22 and 23 together.

The side plates 3 are previously jointed to the cathode substrate 2. Also, the anodes and phosphors are arranged on the anode substrate 1 and an electron emission section including the filaments, grids and the like is arranged on the cathode substrate 2. The anode substrate 1 thus constructed has a sealing glass material 4 applied to or arranged on a periphery thereof and/or the side plates 3 likewise have the sealing glass material 4 applied to or arranged on an upper end surface thereof. Then, the anode substrate 1 and cathode substrate 2 are superposed on each other while being kept opposite to each other. Thereafter, the cathode substrate 2 and anode substrate 1 are positively aligned or registered with respect to each other.

Registration between both substrates 1 and 2 is carried out by, for example, moving the cathode substrate 2 relative to the anode substrate 1 on a movable table to align reference marks on the substrates with each other while observing the marks through a microscope. Upon completion of the registration, both substrates are heated at a part thereof by means of the heater 20 as shown in FIG. 1 and then the heated part of the substrates is exposed to a laser beam 12 fed from a laser unit (not shown) through the optical fiber 11 and discharged from the optical system 10 toward the anode substrate 1.

The anode substrate 1, as described above, is made of glass, to thereby permit the laser beam 12 to permeate therethrough and the sealing glass material 4 is colored grey or black because of containing lead, so that the laser beam 12 is collected on the sealing glass material 4 through the anode substrate 1, to thereby locally heat the sealing glass material 4. This results in the sealing glass material 4 being locally melted to weld the anode substrate 1 and cathode substrate 2 to each other, to thereby temporarily join both substrates to each other, leading to temporary assembling of the glass envelope 30. Such temporary joining is preferably carried out at two locations on the substrates diagonally opposite to each other. Alternatively, it may be conveniently accomplished at four locations likewise diagonally opposite to each other on the substrates.

Such irradiation of both substrates 1 and 2 with the laser beam 12 causes them to be locally heated, resulting in thermal strain possibly remaining therein after cooling of the substrates. In order to prevent generation of such thermal strain, a portion of the substrates in proximity to the above-described part thereof exposed to the laser beams 12 is heated by the heater 20 arranged on a back side of the cathode substrate 2. This minimizes generation of the thermal strain. Also, application of the laser beam 12 for the temporary bonding preferably takes place in such a manner that a pulse height of the laser beam 12 is initially increased and then gradually decreased. This permits the part of the substrates irradiated with the laser beam 12 to be gradually cooled, to thereby further reduce generation of the thermal strain.

The laser beam 12 may be generated by means of any suitable laser unit such as a gas laser unit using gas such as carbon dioxide ($CO_2$), a solid laser unit such as a YAG (yttrium-aluminum-garnet) laser unit, or the like, so long as it may generate a laser beam of a wavelength which permeates through glass for the substrates but fails to permeate through the sealing glass material 4.

In particular, the YAG laser unit is preferably used for the present invention. The YAG laser unit generates a laser beam of about 1.06 µm in wavelength which satisfactorily permeates through a transparent material such as transparent glass or the like. Thus, the laser beam generated from the YAG laser unit is prevented from being absorbed by the anode and cathode substrates 1 and 2 during heating of the sealing glass material 4, so that the anode and cathode substrates 1 and 2 may be prevented from generating heat. Therefore, the YAG laser unit efficiently heats only the sealing glass material 4 while preventing generation of heat from the substrates.

The glass envelope 30 thus temporarily assembled is introduced into an oven while being interposedly fastened by clips in substantially the same manner as shown in FIG. 7, to thereby be sealed. This results in the glass envelope 30 for a fluorescent display device being completed.

In this regard, as shown in FIG. 2, several to tens sets of glass envelopes 30 temporarily assembled are put on the lower support plate 22 while being superposed on each other and then the upper support plate 23 is put on the envelopes. Then, fours bolts are inserted through corners of the upper and lower support plates 23 and 22, followed by threaded fitting of the nuts 25 on the bolts 24. This results in the envelopes 30 being interposedly fastened between the upper support plate 23 and the lower support plate 22 through the bolt-nut combination. Then, the envelopes 30 are introduced into the oven while being kept fastened, so that the sealing glass material 4 of each of the envelopes 30 may be wholly melted, to thereby seal the envelope. Thus, it will be noted that the illustrated embodiment leads to mass production of the envelope without requiring a clip set for every glass envelope.

Figure 3:
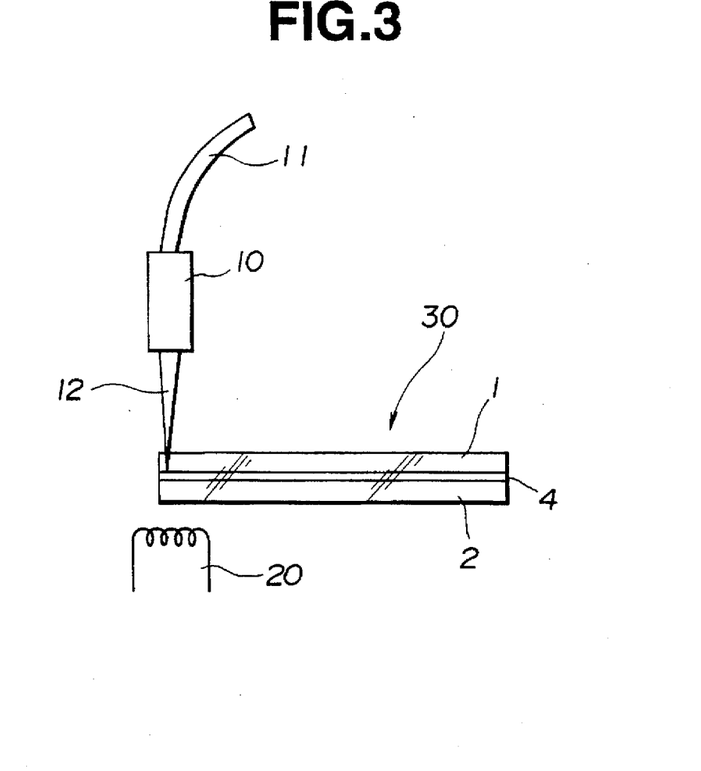
FIG. 3 is a schematic view showing another embodiment of an apparatus for sealedly forming an envelope for a display device according to the present invention which is used for practicing a method for sealedly forming an envelope according to the present invention.
Figure 4:
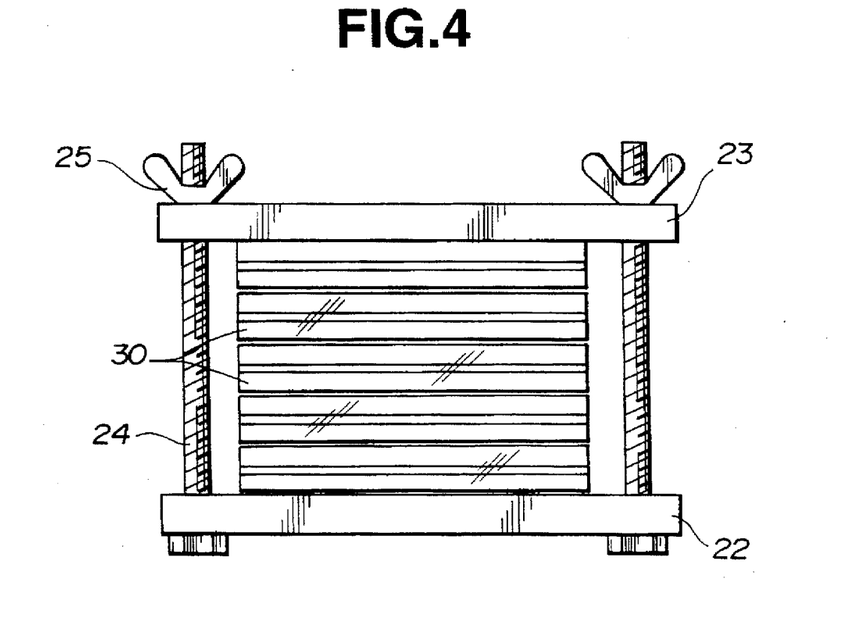
FIG. 4 is a front elevation view showing a plurality of envelopes interposedly superposed on each other during sealing.

Referring now to FIGS. 3 and 4, another embodiment of each of a method for sealedly forming an envelope and an apparatus therefor according to the present invention is illustrated. The embodiment shown in FIGS. 3 and 4 is directed to an envelope for a field emission type display device (FED).

The illustrated embodiment may be constructed in substantially the same manner as the embodiment described above with reference to FIGS. 1 and 2, except that glass beads of a microdiameter are incorporated in a sealing glass material 4. In the illustrated embodiment, an anode substrate 1 and a cathode substrate 3 are temporarily joined to each other by means of a laser beam 12, to thereby provide a glass envelope 30 temporarily assembled, as shown in FIG. 3. Then, several to tens sets of glass envelopes 30 thus temporarily assembled are interposedly supported between an upper support plate 23 and a lower support plate 22, so that a plurality of glass envelopes 30 may be sealedly formed or assembled at once.

In each of the embodiments described above, the envelope is made of glass. However, in the present invention, it is merely required that only at least one of the anode and cathode substrates is made of glass. The other substrate may be made of a metal or semiconductor material in place of glass.

Also, in each of the embodiments, the laser beam 12 is irradiated on the sealing glass material 4 through the anode substrate 1 or cathode substrate 2. In this regard, a laser beam generated from a $CO_2$ laser unit has a wavelength of about 10.6 μm, to thereby substantially fail to permeate through a glass substrate, so that a portion of the substrate exposed to the laser beam generates heat. This fails to permit a material such as the sealing glass material 4 to be efficiently heated. Thus, use of the $CO_2$ laser unit in the present invention requires to irradiate a laser beam directly on the sealing glass material 4 from a side surface of the glass envelope. This permits the sealing glass material 4 to be effectively melted, to thereby accomplish satisfactory temporary assembling of the glass envelope.

Further, in each of the illustrated embodiments, sealing of the glass envelope is carried out in an oven. Alternatively, it may be accomplished by irradiating a laser beam on the sealing glass material 4 over the whole periphery of the glass envelope temporarily assembled. Also, several to ten sets of temporarily assembled glass envelopes are interposed between the lower support plate 22 and the upper support plate 23. Alternatively, the glass envelopes each may be interposedly clamped by clamps. In addition, the envelope is evacuated to a high vacuum when it is used for a fluorescent display device, an FED, a luminous cell for a large image or the like. Alternatively, the envelope may be charged therein with a particular atmosphere when it is used for a display device such as a plasma display device.

Moreover, the embodiments described above each may be so constructed that one of the anode and cathode substrates is made of a glass material and the other is made of a semiconductor material. Such construction permits the envelope to be used for a display device in which light is outwardly emitted therefrom or light is introduced thereinto. For example, it may be used for a semiconductor laser unit, a CCD or the like.

Furthermore, the anode and cathode substrates are temporarily joined to each other at two or four locations thereof for temporary assembling of the envelope. However, a number of locations at which the temporary joining therebetween is carried out may be suitably determined so long as it provides temporary joining sufficient to effectively prevent misregistration or positional deviation between the substrates. In general, two or more locations are preferably determined. More particularly, the locations are determined to be diagonally opposite to each other. Also, metal to be incorporated in the form of particles in the sealing glass material is not limited to lead. Any other suitable metal may be used for this purpose so long as it generates heat upon impingement of a laser beam thereon.

Further, in each of the embodiments described above, the heating means using a laser beam is used for locally heating the substrates to temporarily assemble the envelope. However, the present invention is not limited to such a heating means using a laser beam. The local heating may be conveniently carried out using any other suitable heating means such as a resistance coil heater, a radio-frequency heating unit, a soldering iron or the like.

As can be seen from the foregoing, the present invention is so constructed that the first and second substrates are registered or positionally aligned with each other and then temporarily bonded or joined to each other at at least two locations thereof by locally melting the sealing glass material, to thereby temporarily assemble the envelope. Then, the envelope temporarily assembled is heated in the oven to sealedly join both substrates to each other, resulting in being sealedly assembled or formed. Thus, it will be noted that sealed joining between both substrates can be effectively accomplished while eliminating misregistration or positional deviation between both substrates during transferring and sealing of the substrates.

Also, use of amorphous glass of a low melting point having lead incorporated therein as the sealing glass material facilitates generation of heat from the sealing glass material upon impingement of a laser beam thereon, to thereby rapidly and efficiently accomplish temporarily assembling of the envelope.

During temporary assembling of the envelope using a laser beam, heating of a portion of the first and second substrates in proximity to a portion thereof temporarily joined by a heater minimizes generation of thermal strain, to thereby substantially prevent damage to the envelope.

Further, application of the laser beam for the temporary joining may take place in such a manner that a pulse height of the laser beam is initially increased and then gradually decreased. This permits the portion of the substrates irradiated with the laser beam to be gradually cooled, to thereby further reduce generation of the thermal strain.

In addition, in the present invention, a plurality of sets of the first and second substrates temporarily bonded or joined may be interposedly fastened or held together and placed in the oven while being kept superposed on each other. This permits the present invention to be conveniently applied to mass production of the envelope.

Moreover, the present invention fully eliminates use of an organic adhesive material for assembling of the envelope, to thereby prevent generation of decomposed gas during sealing of the substrates, resulting in preventing the decomposed gas from adversely affecting the anodes and cathodes arranged in the envelope.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A method for sealedly forming an envelope, the method comprising the steps of:
applying a sealing glass material to a periphery of at least one of a first substrate made of a glass material and a second substrate made of a glass, metal or semiconductor material;
registering said first and second substrates with each other while superposing said first and second substrates on each other through said sealing glass material;
locally heating said sealing material by a local heating means after the registration between said first substrate and the second substrate to temporarily bond said first and second substrates to each other at least at two locations thereof; and
heating said registered and temporarily bonded first and second substrates in an oven to sealedly bond said substrates to each other and sealedly form an envelope.

2. A method as defined in claim 1, wherein said local heating means utilizes a laser beam.

3. A method as defined in claim 2, wherein said laser beam is applied in such a manner that a pulse height of the laser beam is initially increased and then gradually decreased.

4. A method as defined in claim 2 or 3, wherein a portion of said first and second substrates in proximity to said at least two locations at which said temporary bonding is carried out is heated by a heater.

5. A method as defined in claim 1, wherein said sealing glass material comprises amorphous glass of a low melting point having lead incorporated therein.

* * * * *